United States Patent
Ramanathan et al.

(10) Patent No.: US 11,966,870 B2
(45) Date of Patent: Apr. 23, 2024

(54) SYSTEM AND METHOD FOR DETERMINATION OF RECOMMENDATIONS AND ALERTS IN AN ANALYTICS ENVIRONMENT

(71) Applicant: ORACLE INTERNATIONAL CORPORATION, Redwood Shores, CA (US)

(72) Inventors: Krishnan Ramanathan, Bengaluru (IN); Jagdish Chand, Dublin, CA (US); Aman Madaan, Pittsburgh, PA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/851,872

(22) Filed: Apr. 17, 2020

(65) Prior Publication Data

US 2020/0334608 A1    Oct. 22, 2020

(30) Foreign Application Priority Data

Apr. 18, 2019  (IN) .............. 201941015571
Apr. 18, 2019  (IN) .............. 201941015572
(Continued)

(51) Int. Cl.
*G06Q 10/0637* (2023.01)
*G06F 16/21* (2019.01)
(Continued)

(52) U.S. Cl.
CPC ..... *G06Q 10/06375* (2013.01); *G06F 16/211* (2019.01); *G06F 16/254* (2019.01);
(Continued)

(58) Field of Classification Search
CPC ...... G06F 17/18; G06F 16/254; G06F 16/211; G06F 16/283; G06F 16/27; G06N 5/04;
(Continued)

(56) References Cited

U.S. PATENT DOCUMENTS 7,058,615 B2   6/2006  Yao
7,151,438 B1  12/2006  Hall et al.
(Continued)

FOREIGN PATENT DOCUMENTS

EP    3352103    7/2018

OTHER PUBLICATIONS

"Cross-tenant analytics using extracted data—single-tenant app", published Dec. 18, 2018, retrieved from https://docs.microsoft.com/en-us/azure/sql-database/saas-tenancy-tenant-analytics on Dec. 5, 2019, 15 pages.
(Continued)

*Primary Examiner* — Deirdre D Hatcher
(74) *Attorney, Agent, or Firm* — TUCKER ELLIS LLP

(57) ABSTRACT

In accordance with an embodiment, described herein are systems and methods for use with an analytic applications environment, for determination of recommendations and alerts in such environments. A data pipeline or process can operate in accordance with an analytic applications schema adapted to address particular analytics use cases or best practices, to receive data from a customer's (tenant's) enterprise software application or data environment, for loading into a data warehouse instance. When provided as part of a software-as-a-service (SaaS) or cloud environment, the data sourced from a plurality of organizations can be aggregated, to leverage information gleaned from the collective or shared data. The system can be used to generate semantic alerts, including obtaining permission from; and analyzing the collective data of; the plurality of organizations, to
(Continued)

determine operational advantages indicated by the data, and providing alerts associated with those operational advantages.

20 Claims, 14 Drawing Sheets

(30) Foreign Application Priority Data

Apr. 18, 2019 (IN) .............................. 201941015582
Apr. 18, 2019 (IN) .............................. 201941015583

(51) Int. Cl.
| | | |
|---|---|---|
| *G06F 16/25* | (2019.01) | |
| *G06F 16/27* | (2019.01) | |
| *G06F 16/28* | (2019.01) | |
| *G06F 17/18* | (2006.01) | |
| *G06N 5/04* | (2023.01) | |
| *G06Q 30/0201* | (2023.01) | |

(52) U.S. Cl.
CPC .......... *G06F 16/27* (2019.01); *G06F 16/283* (2019.01); *G06F 17/18* (2013.01); *G06N 5/04* (2013.01); *G06Q 30/0201* (2013.01); *G06Q 30/0206* (2013.01)

(58) Field of Classification Search
CPC .......... G06Q 30/0206; G06Q 30/0201; G06Q 10/06375
See application file for complete search history.

(56) References Cited

U.S. PATENT DOCUMENTS

| | | | |
|---|---|---|---|
| 7,739,292 | B2 | 6/2010 | Falk |
| 7,974,896 | B2 | 7/2011 | Busse et al. |
| 8,010,426 | B2 | 8/2011 | Kopp et al. |
| 8,150,744 | B2 | 4/2012 | Zoldi |
| 8,386,419 | B2 | 2/2013 | Yalamanchilli |
| 8,543,535 | B2 | 9/2013 | Satpathy |
| 8,554,801 | B2 | 10/2013 | Mack |
| 8,719,769 | B2 | 5/2014 | Castellanos |
| 8,775,372 | B2 | 7/2014 | Dary |
| 8,799,209 | B2 | 8/2014 | Bakalash |
| 8,983,914 | B2 | 3/2015 | Kung et al. |
| 9,152,662 | B2 | 10/2015 | Bhide |
| 9,239,996 | B2 | 1/2016 | Moorthi |
| 9,244,951 | B2 | 1/2016 | Mandelstein |
| 9,355,145 | B2 | 5/2016 | George |
| 9,430,505 | B2 | 8/2016 | Padmanabhan et al. |
| 9,442,993 | B2 | 9/2016 | Tung |
| 9,460,188 | B2 | 10/2016 | Mundlapudi et al. |
| 9,483,537 | B1 | 11/2016 | Peters |
| 9,509,571 | B1 | 11/2016 | Liu |
| 9,619,535 | B1 | 4/2017 | Kapoor |
| 9,633,095 | B2 | 4/2017 | Mehra |
| 9,870,629 | B2 | 1/2018 | Cardno |
| 9,904,706 | B2 | 2/2018 | Bhattacharjee |
| 9,922,104 | B1 | 3/2018 | Kapoor |
| 9,961,011 | B2 | 5/2018 | Mordani |
| 9,971,819 | B2 | 5/2018 | Bender |
| 10,019,451 | B2 | 7/2018 | Preslan |
| 10,055,431 | B2 | 8/2018 | Marrelli et al. |
| 10,078,676 | B2 | 9/2018 | Bhagat |
| 10,108,683 | B2 | 10/2018 | Dhayapule |
| 10,110,390 | B1 | 10/2018 | Nguyen |
| 10,191,802 | B2 | 1/2019 | Nautiyal |
| 10,206,770 | B2 | 2/2019 | Seng |
| 10,275,409 | B2 | 4/2019 | Tung |
| 10,324,932 | B2 | 6/2019 | Gordon |
| 10,423,639 | B1 | 9/2019 | Kapoor |
| 10,423,688 | B1 | 9/2019 | Patton |
| 10,437,846 | B2 | 10/2019 | Venkatasubramanian |
| 10,552,443 | B1* | 2/2020 | Wu .................. G06F 16/258 |
| 10,572,679 | B2 | 2/2020 | Frank |
| 10,620,923 | B2 | 4/2020 | Allan |
| 10,635,686 | B2 | 4/2020 | Wan |
| 10,664,321 | B2 | 5/2020 | Reddipalli |
| 10,685,033 | B1 | 6/2020 | Searls |
| 10,762,086 | B2 | 9/2020 | Wu |
| 10,795,895 | B1 | 10/2020 | Taig |
| 10,860,562 | B1 | 12/2020 | Gupta |
| 10,866,938 | B2 | 12/2020 | Gupta |
| 10,936,614 | B2 | 3/2021 | Kumar |
| 10,970,303 | B1 | 4/2021 | Denton |
| 10,997,129 | B1 | 5/2021 | Nanda |
| 11,106,508 | B2 | 8/2021 | Calhoun |
| 11,190,599 | B2 | 11/2021 | Greenstein |
| 11,194,795 | B2 | 12/2021 | Muralidhar |
| 11,194,813 | B2 | 12/2021 | Johnson, III |
| 11,321,290 | B2 | 5/2022 | Yan |
| 11,367,034 | B2 | 6/2022 | Chintalapati |
| 11,436,259 | B2 | 9/2022 | Chawla |
| 11,614,976 | B2 | 3/2023 | Ramanathan |
| 11,640,406 | B2 | 5/2023 | Reinshagen |
| 2002/0178077 | A1 | 11/2002 | Katz et al. |
| 2004/0215584 | A1 | 10/2004 | Yao |
| 2006/0195492 | A1 | 8/2006 | Clark |
| 2007/0073712 | A1 | 3/2007 | Falk |
| 2008/0162509 | A1 | 7/2008 | Becker |
| 2008/0195430 | A1* | 8/2008 | Rustagi ............ G06Q 10/06395 |
| | | | 705/7.41 |
| 2008/0250057 | A1 | 10/2008 | Rothstein et al. |
| 2009/0076866 | A1 | 3/2009 | Zoldi |
| 2009/0319544 | A1 | 12/2009 | Griffin |
| 2010/0057548 | A1 | 3/2010 | Edwards |
| 2010/0280990 | A1 | 11/2010 | Castellanos |
| 2011/0047525 | A1 | 2/2011 | Castellanos |
| 2011/0055231 | A1 | 3/2011 | Huck |
| 2011/0113467 | A1* | 5/2011 | Agarwal ............. H04L 63/0263 |
| | | | 718/1 |
| 2011/0208692 | A1 | 8/2011 | Satpathy |
| 2011/0231454 | A1 | 9/2011 | Mack |
| 2011/0261049 | A1 | 10/2011 | Cardno |
| 2011/0295793 | A1 | 12/2011 | Venkatasubramanian |
| 2011/0295795 | A1 | 12/2011 | Venkatasubramanian |
| 2012/0089564 | A1 | 4/2012 | Bakalash |
| 2012/0131591 | A1 | 5/2012 | Moorthi |
| 2012/0191642 | A1 | 7/2012 | George |
| 2012/0232950 | A1* | 9/2012 | Kadkol ................ G06Q 10/063 |
| | | | 705/7.29 |
| 2012/0310875 | A1 | 12/2012 | Prahlad |
| 2013/0086121 | A1 | 4/2013 | Preslan |
| 2013/0086134 | A1 | 4/2013 | Doughan |
| 2013/0166515 | A1 | 6/2013 | Kung |
| 2013/0185309 | A1 | 7/2013 | Bhide |
| 2013/0191306 | A1 | 7/2013 | Wilkinson |
| 2013/0238641 | A1 | 9/2013 | Mandelstein |
| 2013/0332226 | A1* | 12/2013 | Nair ..................... G06Q 10/087 |
| | | | 705/7.29 |
| 2014/0007190 | A1* | 1/2014 | Alperovitch ........ H04L 63/1441 |
| | | | 726/3 |
| 2014/0075032 | A1 | 3/2014 | Vasudevan |
| 2014/0164033 | A1 | 6/2014 | Baskaran et al. |
| 2014/0229511 | A1 | 8/2014 | Tung |
| 2014/0349272 | A1 | 11/2014 | Kutty et al. |
| 2015/0033217 | A1 | 1/2015 | Mellor |
| 2015/0186481 | A1 | 7/2015 | Mehra |
| 2015/0207758 | A1 | 7/2015 | Mordani |
| 2015/0213470 | A1* | 7/2015 | Rush .................... G06Q 30/0206 |
| | | | 705/80 |
| 2015/0256475 | A1 | 9/2015 | Suman et al. |
| 2016/0092059 | A1 | 3/2016 | Tu |
| 2016/0224803 | A1 | 8/2016 | Frank |
| 2016/0292192 | A1 | 10/2016 | Bhagat |
| 2016/0306827 | A1 | 10/2016 | Dos Santos et al. |
| 2016/0314175 | A1 | 10/2016 | Dhayapule |
| 2016/0328566 | A1 | 11/2016 | Nellamakkada |
| 2017/0004187 | A1 | 1/2017 | Tung |
| 2017/0006135 | A1* | 1/2017 | Siebel ................. H04L 67/2833 |
| 2017/0011087 | A1 | 1/2017 | Hyde |
| 2017/0068595 | A1 | 3/2017 | Nautiyal |

(56) References Cited

U.S. PATENT DOCUMENTS

| | | | |
|---|---|---|---|
| 2017/0104627 | A1 | 4/2017 | Bender |
| 2017/0116295 | A1 | 4/2017 | Wan |
| 2017/0161344 | A1 | 6/2017 | Vasireddy |
| 2017/0249361 | A1 | 8/2017 | Gordon |
| 2018/0032550 | A1 | 2/2018 | Gupta |
| 2018/0052898 | A1 | 2/2018 | Allan |
| 2018/0060400 | A1 | 3/2018 | Wu |
| 2018/0060402 | A1 | 3/2018 | Fabjanski |
| 2018/0150529 | A1 | 5/2018 | McPherson et al. |
| 2018/0167370 | A1* | 6/2018 | Frahim .......... H04L 63/102 |
| 2018/0329966 | A1 | 11/2018 | Ranganathan |
| 2019/0042322 | A1 | 2/2019 | Calhoun |
| 2019/0114211 | A1 | 4/2019 | Reddipalli |
| 2019/0294596 | A1 | 9/2019 | Yan |
| 2019/0317972 | A1 | 10/2019 | Patton |
| 2020/0004863 | A1 | 1/2020 | Kumar |
| 2020/0007631 | A1 | 1/2020 | Greenstein |
| 2020/0012647 | A1 | 1/2020 | Johnson, III |
| 2020/0081991 | A1* | 3/2020 | Caputo .......... G06F 16/24578 |
| 2020/0104775 | A1 | 4/2020 | Chintalapati |
| 2020/0334089 | A1 | 10/2020 | Ramanathan |
| 2020/0334240 | A1 | 10/2020 | Muralidhar |
| 2020/0334267 | A1 | 10/2020 | Ramanathan |
| 2020/0334268 | A1 | 10/2020 | Vasireddy |
| 2020/0334270 | A1 | 10/2020 | Vasireddy |
| 2020/0334271 | A1 | 10/2020 | Ramanathan |
| 2020/0334608 | A1 | 10/2020 | Ramanathan |
| 2020/0349155 | A1 | 11/2020 | Reinshagen |
| 2021/0049183 | A1 | 2/2021 | Ramanathan |
| 2021/0342341 | A1 | 11/2021 | Fujimaki |

OTHER PUBLICATIONS

"ETL Validator: Key Features", retrieved from https://www.datagaps.com/etl-testing-tools/etl-validator/ on Nov. 27, 2019, 2 pages.

Gawande, Sandesh; "ETL Strategy for the Enterprise: ETL Startegy to store data validation rules", ETLGuru, retrieved from http://etlguru.com/?p=22 on Nov. 27, 2019, 2 pages.

Homayouni, Hajar; "An Approach for Testing the Extract-Transform-Load Process in Data Warehouse Systems", Thesis, Fall 2017, Colorado State University, 96 pages.

Kim, et al., "A Component-Based Architecture for Preparing Data in Data Warehousing", Jun. 2000, retrieved from https://www.researchgate.net/profile/Eui_Hong2/publication/2466873_A_Component-Based_Architecture_for_Preparing_Data_in_Data_Warehousing/links/541be8930cf25ebee98dac5c/A-Component-Based-Architecture-for-Preparing-Data-in-Data-Warehousing.pdf, 8 pages.

"Making cloud ETL routines work", The Chartered Institute for IT, published Sep. 6, 2017, retrieved from https://www.bcs.org/content-hub/making-cloud-etl-routines-work/ on Dec. 5, 2019, 4 pages.

Ong, et al., "Dynamic-ETL: a hybrid approach for health data extraction, transformation and loading", published on Sep. 13, 2017, retrieved from https://www.ncbi.nlm.nih.gov/pmc/articles/PMC5598056/ on Nov. 27, 2019, 10 pages.

Subash, Muthiah; "An Approach to Multi-Tenant Customer Data Isolation Using SQL Server and Tableau 8.1", published Jun. 18, 2014, retrieved from https://www.credera.com/blog/business-intelligence/approach-multi-tenant-customer-data-isolation-using-sql-server-tableau-8-1/, 6 pages.

"Use Power BI with SQL Data Warehouse", Engineering ME366, Boston University Academy, retrieved from https://www.coursehero.com/file/p25tovsh/Scored-Labels-the-classification-done-by-the-model-bike-buyer-1-or-not-0-This/ on Nov. 27, 2019, 1 page.

United States Patent and Trademark Office, Office Communication dated Aug. 23, 2023 for U.S. Appl. No. 16/920,574 , 16 pages.

Ramesh, S. M. and Gomathy, B. "Review on Scheduling Algorithms for Data Warehousing" International Journal of Science and Research (IJSR), vol. 3 Issue 9, Sep. 2014, 6 pages.

United States Patent and Trademark Office, Office Communication dated Sep. 21, 2021 for U.S. Appl. No. 16/852,070, 17 pages.

United States Patent and Trademark Office, Office Communication dated Feb. 22, 2022 for U.S. Appl. No. 16/852,070, 22 pages.

United States Patent and Trademark Office, Notice of Allowance and Fee(s) Due dated Jul. 20, 2022 for U.S. Appl. No. 16/852,070, 10 pages.

United States Patent and Trademark Office, Office Communication dated May 11, 2022 for U.S. Appl. No. 16/862,394 , 19 pages.

United States Patent and Trademark Office, Notice of Allowance and Fee(s) Due dated Sep. 2, 2022 for U.S. Appl. No. 16/862,394 , 9 pages.

United States Patent and Trademark Office, Notice of Allowance and Fee(s) Due dated Dec. 29, 2022 for U.S. Appl. No. 16/862,394 , 8 pages.

United States Patent and Trademark Office, Office Communication dated Aug. 19, 2021 for U.S. Appl. No. 16/862,394 , 15 pages.

European Patent Office, Notification of Transmittal of the International Search Report and the Written Opinion of the International Searching Authority, or the Declaration dated Jul. 6, 2020 for International Patent Application No. PCT/US2020/030547 , 11 pages.

United States Patent and Trademark Office, Office Communication dated Sep. 15, 2023 for U.S. Appl. No. 17/883,471 , 6 pages.

United States Patent and Trademark Office, Office Communication dated Mar. 3, 2022 for U.S. Appl. No. 16/868,081 , 10 pages.

United States Patent and Trademark Office, Office Communication dated Dec. 8, 2022 for U.S. Appl. No. 16/868,081 , 14 pages.

United States Patent and Trademark Office, Notice of Allowance and Fee(s) Due dated Jul. 26, 2023 for U.S. Appl. No. 16/851,869 , 9 pages.

United States Patent and Trademark Office, Notice of Allowance and Fee(s) Due dated Dec. 13, 2022 for U.S. Appl. No. 16/853,428 , 10 pages.

United States Patent and Trademark Office, Office Communication dated Jun. 17, 2022 for U.S. Appl. No. 16/853,428 , 21 pages.

United States Patent and Trademark Office, Office Communication dated Jun. 8, 2022 for U.S. Appl. No. 16/920,574 , 14 pages.

United States Patent and Trademark Office, Office Communication dated Aug. 15, 2022 for U.S. Appl. No. 17/076,164 , 15 pages.

United States Patent and Trademark Office, Office Communication dated Jan. 31, 2023 for U.S. Appl. No. 17/076,164 , 26 pages.

Dageville, Benoit et al., "The Snowflake Elastic Data Warehouse" Snowflake Computing; ACM 2016, SIGMOD/PODS 'Jun. 26-Jul. 1, 2016, San Francisco, CA, © 2016, pp. 215-226.

Ganapathi, Archana et al., "Statistics-Driven Workload Modeling for the Cloud", ICDE Workshops 2010, © 2010 IEEE, pp. 87-92.

Tu, Yingying and Guo Chaozhen "An Intelligent ETL Workflow Framework based on data Partition", IEEE 2010, © 2010, pp. 358-363.

Albrecht, Alexander and Naumann, Felix; "Managing ETL Processes" VLDB '08, Aug. 24-30, 2008, Auckland, New Zealand, © 2008 VLDB Endowment, ACM, 4 pages.

Schneider, Erich et al., "Sap Hana® Platform—Technical Overview: Driving Innovations in IT and in Business with In-Memory Computing Technology", Feb. 21, 2012, 20 pages.

Shukla, Anshu; Chaturvedi, Shilpa and Simmhan, Yogesh "RIotBench: A Real-time IoT Benchmark for Distributed Stream Processing Platforms", 34 pages, Jan. 2017, <https://arxiv.org/abs/1701.08530v1>.

Oracle, "Fusion Middleware Developing Integration Projects with Oracle Data Integrator 12c (12.2.1.1)", May 2016, 340 pages.

Oracle, "Fusion Middleware Developing Integration Projects with Oracle Data Integrator—Overview of Oracle Data Integrator Topology", 4 pages, retrieved on Oct. 20, 2022 from: <https://docs.oracle.com/middleware/12211/odi/develop/setup_topology.htm#ODIDG171>.

Domingues, Marcos Aurelio, "An Independent Platform for the Monitoring, Analysis and Adaptation of Web Sites", Proceedings of the 2008 SCM conference on Recommender systems, Oct. 2008, pp. 299-302.

(56) References Cited

OTHER PUBLICATIONS

United States Patent and Trademark Office, Office Communication dated Nov. 28, 2023 for U.S. Appl. No. 17/076,164 , 30 pages.
United States Patent and Trademark Office, Office Communication dated Nov. 7, 2023 for U.S. Appl. No. 18/137,306 , 20 pages.

* cited by examiner

SYSTEM AND METHOD FOR DETERMINATION OF RECOMMENDATIONS AND ALERTS IN AN ANALYTICS ENVIRONMENT

CLAIM OF PRIORITY

This application claims the benefit of priority to India Provisional Patent Application titled "SYSTEM AND METHOD FOR AUTOMATIC GENERATION OF EXTRACT, TRANSFORM, LOAD (ETL) ASSERTS", Application No. 201941015571, filed Apr. 18, 2019; India Provisional Patent Application titled "SYSTEM AND METHOD FOR RANKING OF EXTRACT, TRANSFORM, LOAD (ETL) ALERTS", Application No. 201941015572, filed Apr. 18, 2019; India Provisional Patent Application titled "SYSTEM AND METHOD FOR OPTIMIZATION OF VIRTUAL MACHINES FOR EXTRACT, TRANSFORM, LOAD (ETL)", Application No. 201941015582, filed Apr. 18, 2019; and India Provisional Patent Application titled "SYSTEM AND METHOD FOR DETERMINATION OF RECOMMENDATIONS AND ALERTS IN AN ANALYTICS ENVIRONMENT", Application No. 201941015583, filed Apr. 18, 2019; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, computer-based methods of providing business intelligence data, and systems and methods, for use with an analytic applications environment, for determination of recommendations and alerts in such environments.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

During the loading of data, from one or more data sources, to a data warehouse or other database, there may be a need to prepare the data in some manner; for example by extracting the data from a highly-normalized transactional system data source, and transforming the data into one or more data warehouse or database schemas that support analytic querying and business intelligence processes.

For example, an Extract, Transform, and Load (ETL) process can be used to extract data from a source database, pass the data through a middle-tier transformation server, and then transform the data into a schema suitable for use in a data warehouse. During such process, data that may need to be looked-up from the target database can be cached on a local server. Once the data is transformed locally, it can be loaded into the target database.

A data warehouse can store large amounts of enterprise-critical data, such as, for example, data related to procurement prices, employee salaries, or expense reports; and as such is rich in valuable business intelligence information. However, conventionally the data stored by an organization in a data warehouse is generally not shared with other organizations; and instead each organization has generally been limited to only that information that could be extracted from their own data warehouse.

SUMMARY

In accordance with an embodiment, described herein are systems and methods for use with an analytic applications environment, for determination of recommendations and alerts in such environments. A data pipeline or process can operate in accordance with an analytic applications schema adapted to address particular analytics use cases or best practices, to receive data from a customer's (tenant's) enterprise software application or data environment, for loading into a data warehouse instance. When provided as part of a software-as-a-service (SaaS) or cloud environment, the data sourced from a plurality of organizations can be aggregated, to leverage information gleaned from the collective or shared data. The system can be used to generate semantic alerts, including obtaining permission from; and analyzing the collective data of; the plurality of organizations, to determine operational advantages indicated by the data, and providing alerts associated with those operational advantages.

DETAILED DESCRIPTION

Figure 1:
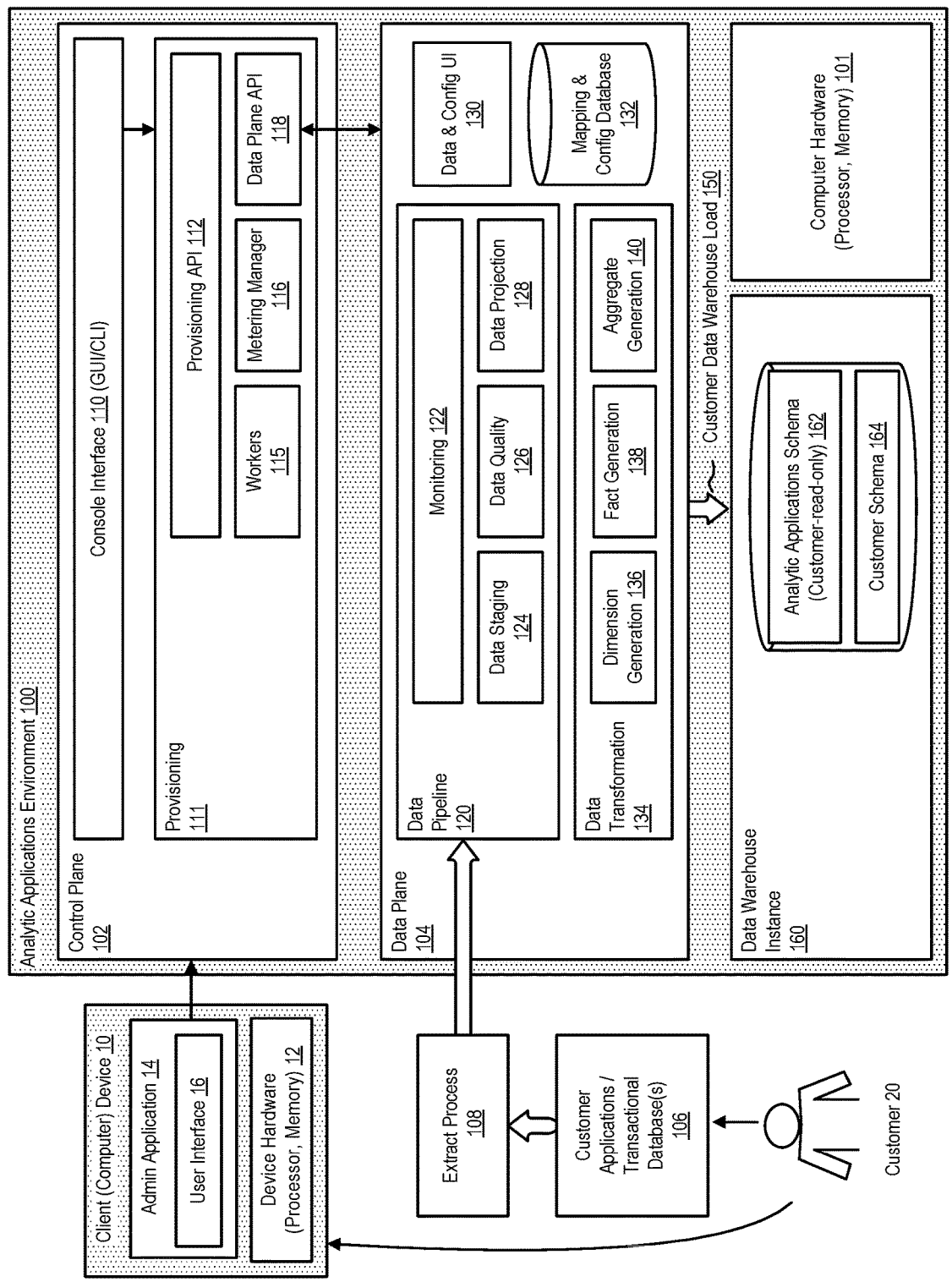
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

A technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse component, such as, for example an Oracle Autonomous Data Warehouse Cloud (ADWC) environment, or other type of data warehouse component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an ADWC tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

Introduction

In accordance with an embodiment, a data warehouse environment or component, such as, for example an Oracle Autonomous Data Warehouse Cloud (ADWC) environment, or other type of data warehouse component adapted to store large amounts of data, can provide a central repository for storage of data collected by one or more business applications.

For example, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example an Oracle Business Intelligence Applications (OBIA) environment, or other type of BI component adapted to examine large amounts of data sourced either by the customer (tenant) itself, or from multiple third-party entities.

For example, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, the analytic applications environment can be used to pre-populate a reporting interface of a data warehouse instance with relevant metadata describing business-related data objects in the context of various business productivity software applications, for example to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

The components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example an Oracle Analytics Cloud or Oracle Cloud Infrastructure environment, or other type of cloud environment.

For example, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, the provisioning component can be accessed and utilized, via the console interface, by a customer (tenant) to purchase one or more of a suite of business productivity software applications, together with a data warehouse instance for use with those software applications.

A customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

The provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, provisioning and configuration changes directed to services provided by the data plane can be communicated to the data plane via the data plane API.

In accordance with an embodiment, the metering manager can include various functionality that meters services and usage of services provisioned through control plane.

For example, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

To support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

Data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
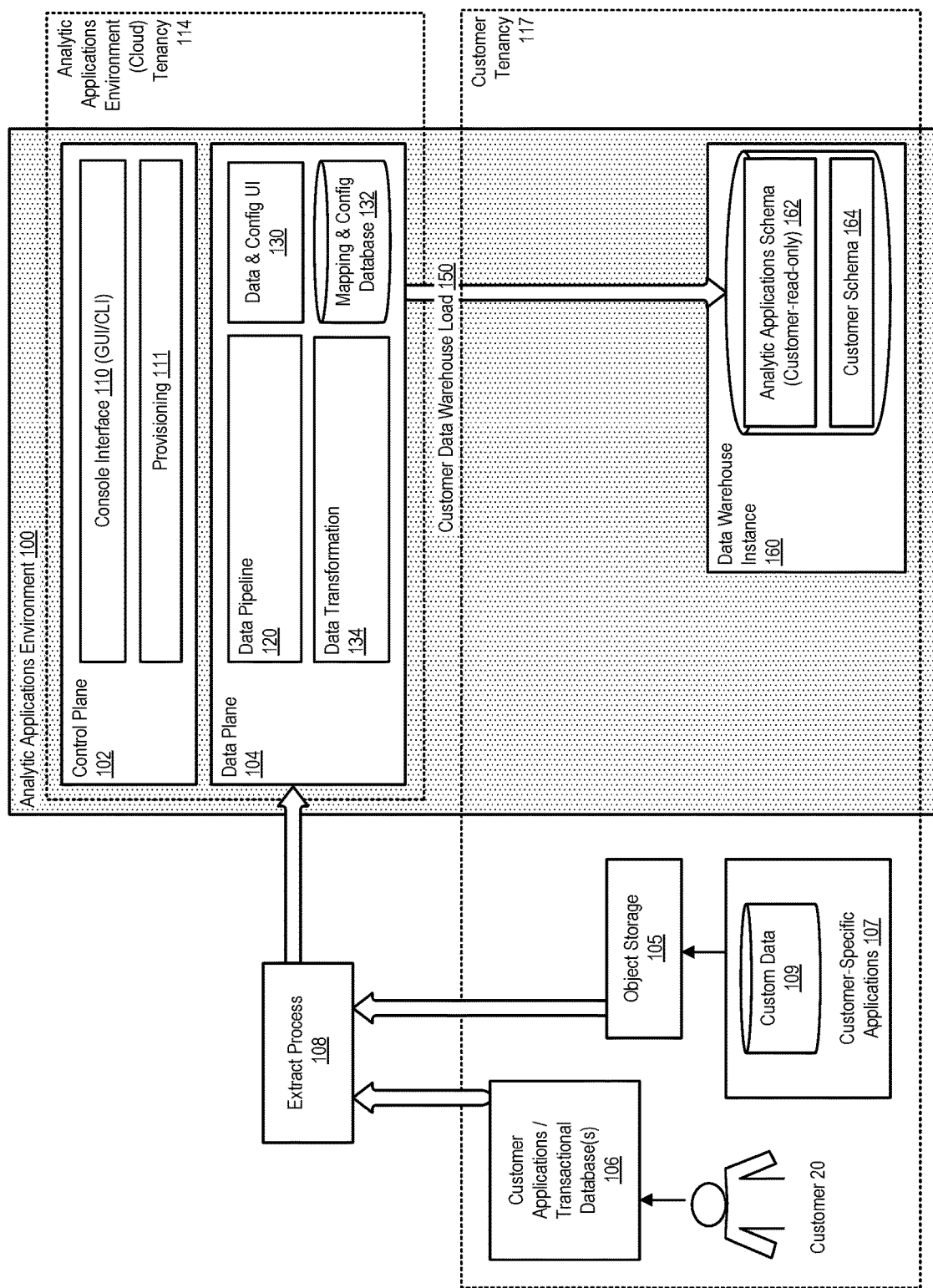
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

For a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
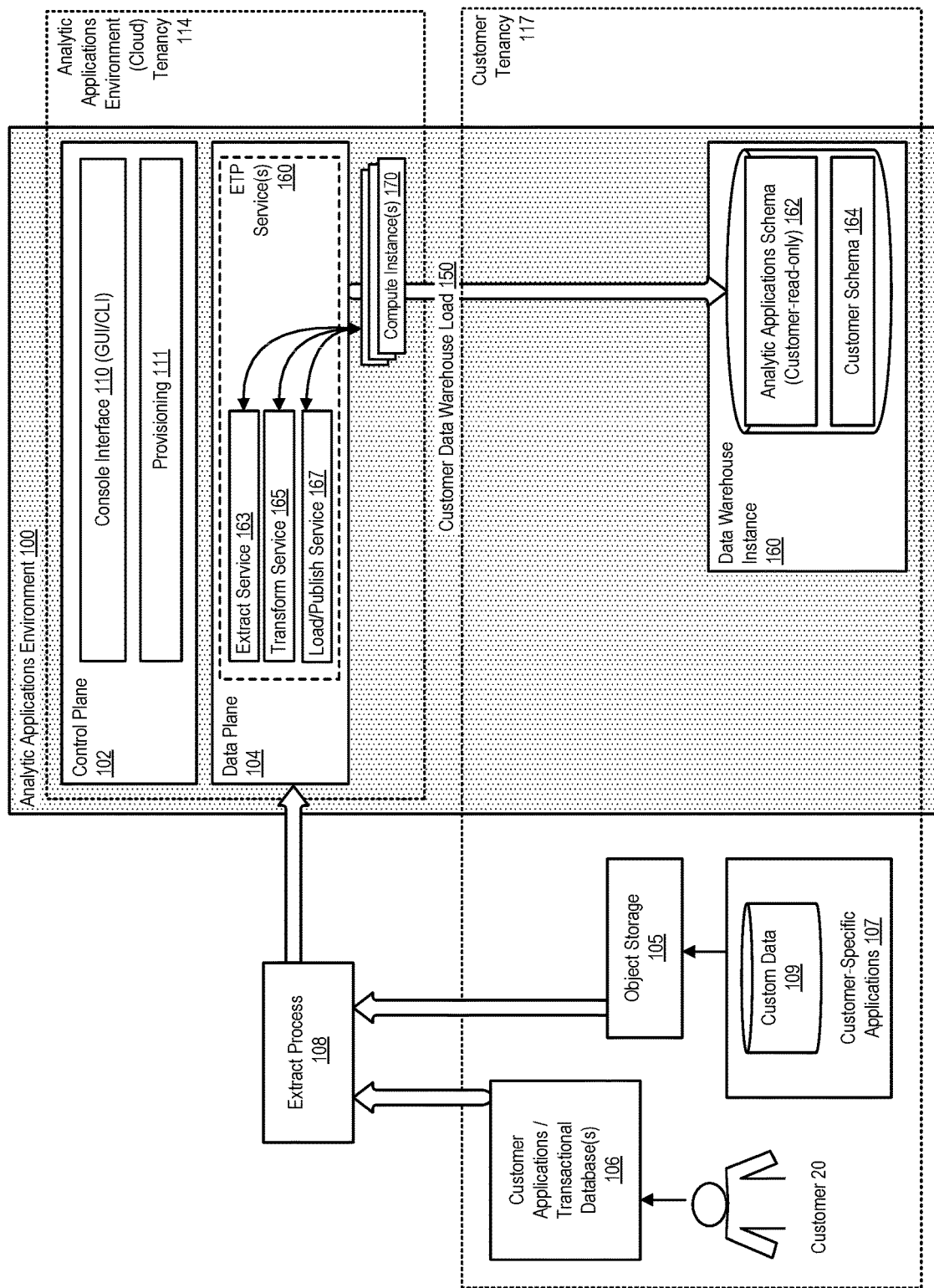
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, for example an Oracle Storage Service (OSS) component, for storage of the data.

Transformation: In accordance with an embodiment, the transformation process takes the data files from object storage component (e.g., OSS), and applies a business logic while loading them to a target data warehouse, e.g., ADWC database, which is internal to the data pipeline or process, and is not exposed to the customer (tenant).

Load/Publish: In accordance with an embodiment, a load/publish service or process takes the data from the, e.g., IADW warehouse, and publishes it to a data warehouse instance that is accessible to the customer (tenant).

Multiple Customers (Tenants)

Figure 4:
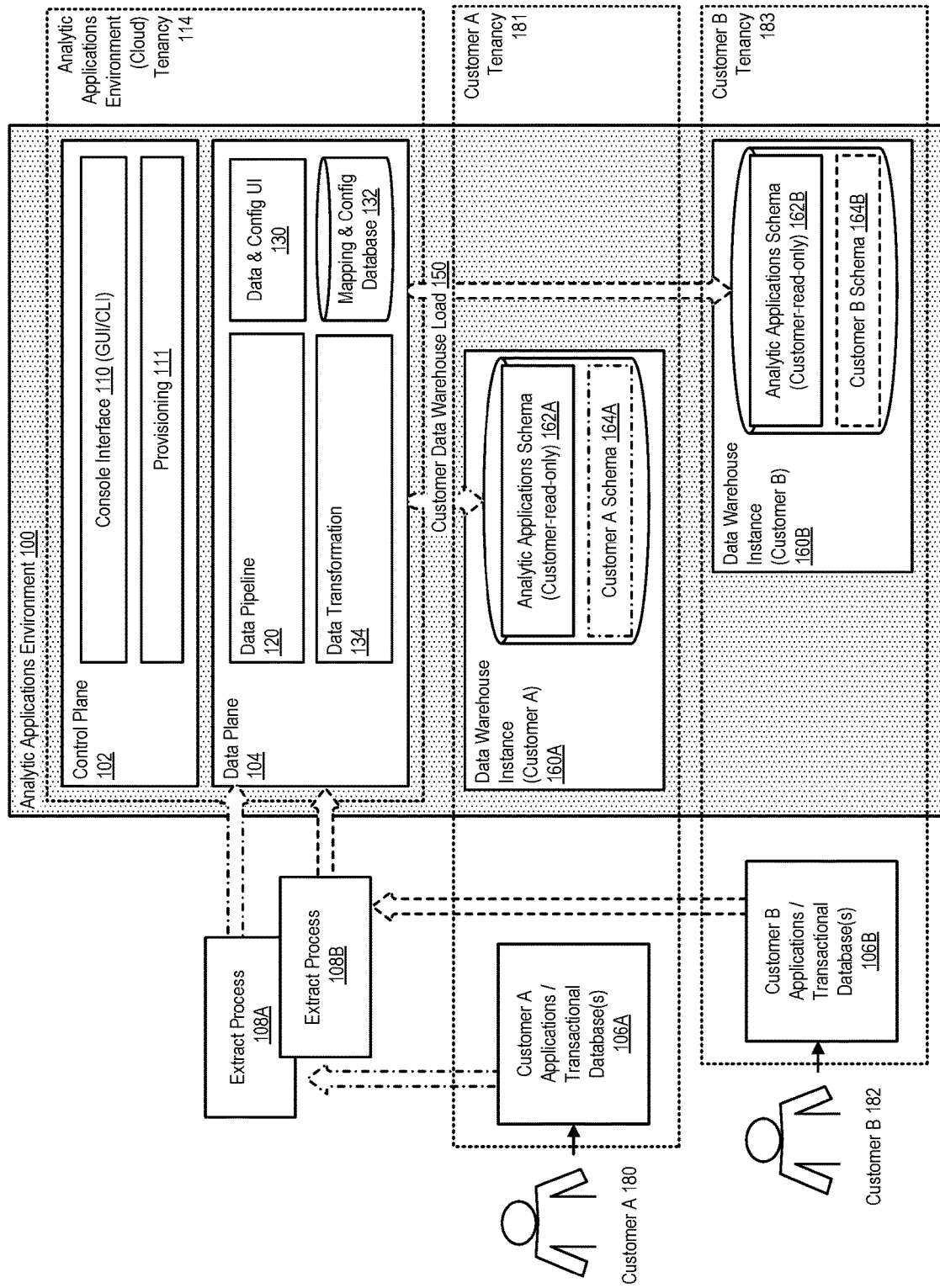
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

For each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema 164A, 164B that is readily modifiable by the customer, and which allows the customer to supplement and utilize the data within their own data warehouse instance.

As described above, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
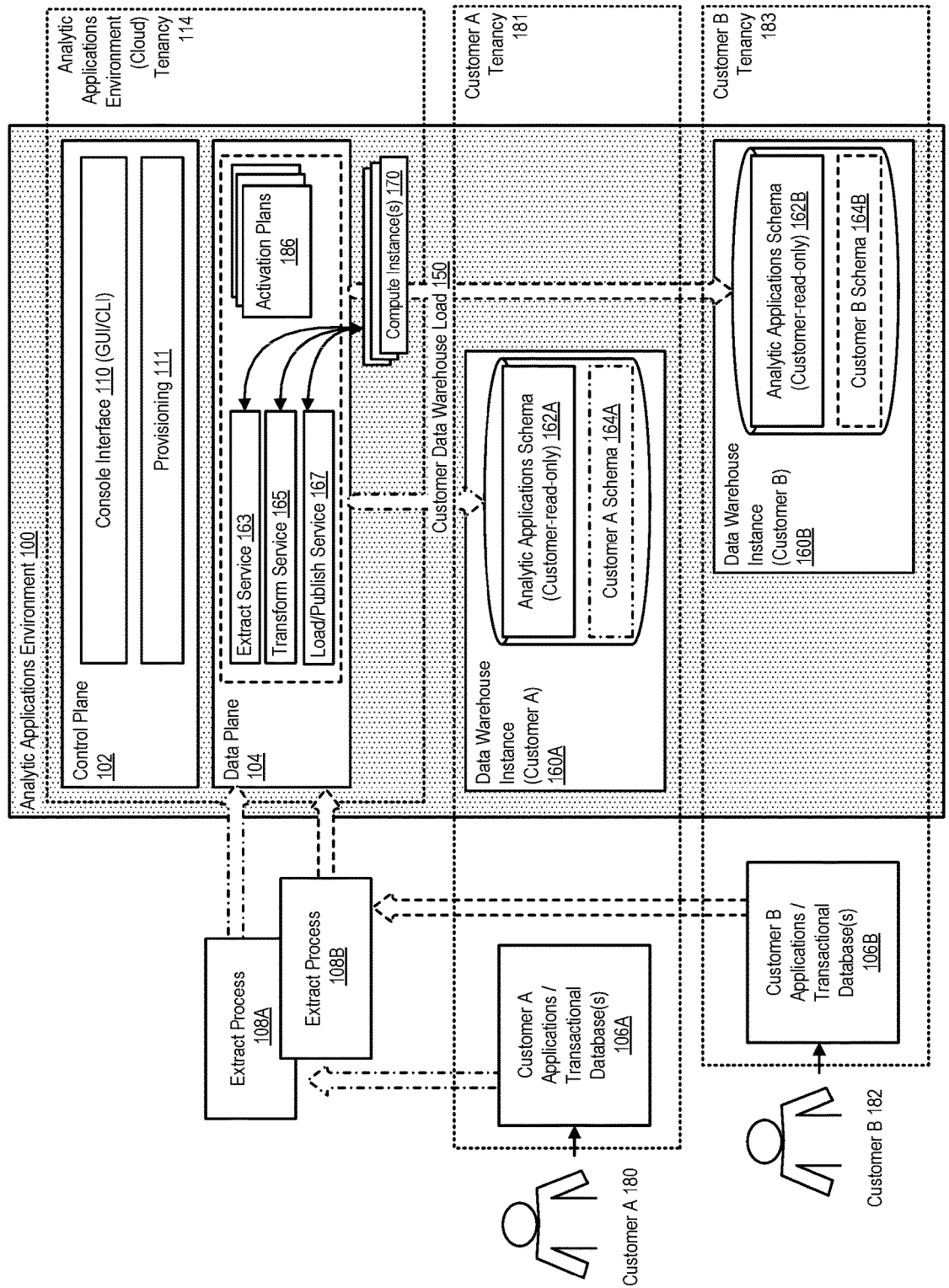
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, an activation plan can define a number of extract, transform, and load (publish) services or steps to be run in a certain order, at a certain time of day, and within a certain window of time.

Each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
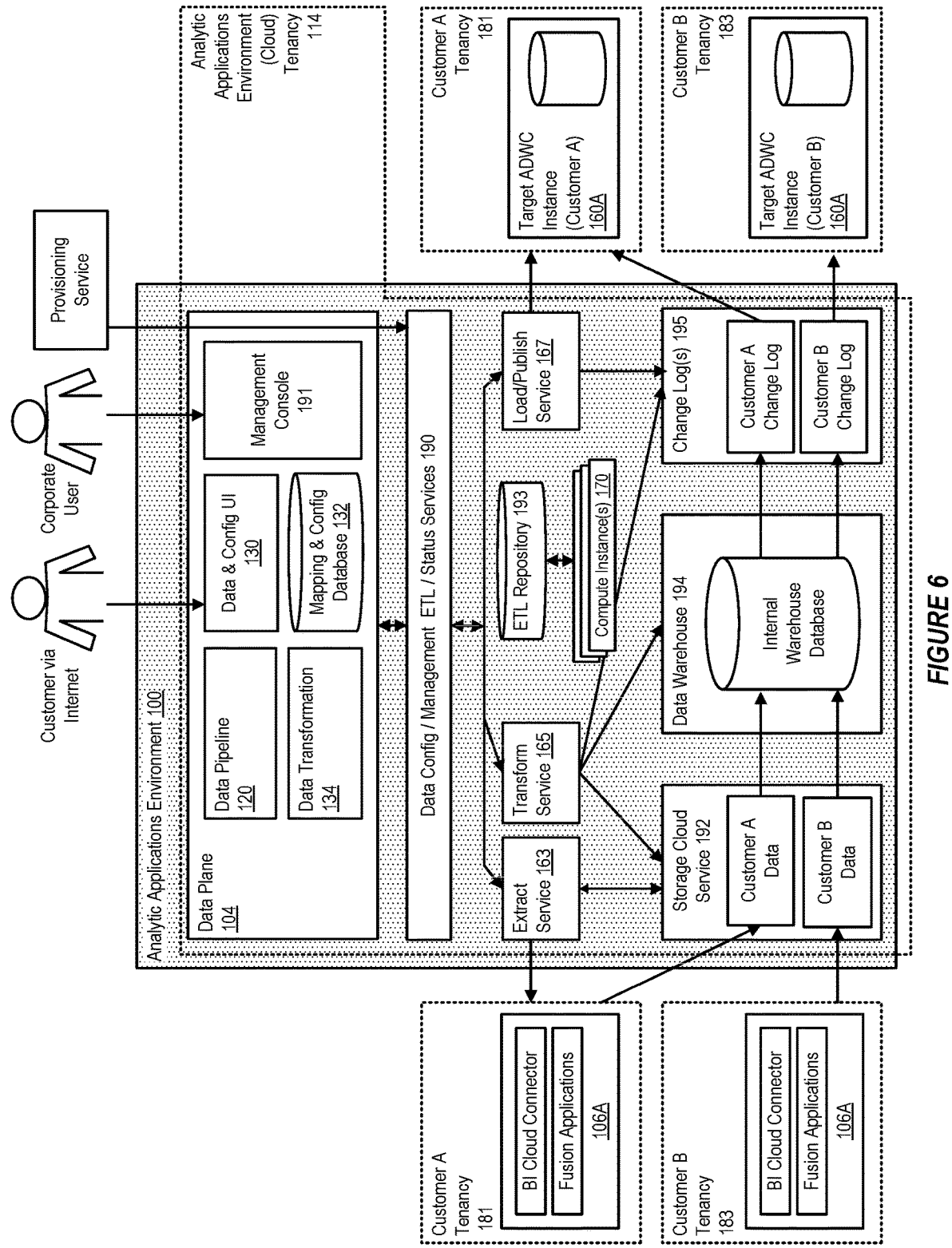
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management /ETL//status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., IADW) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
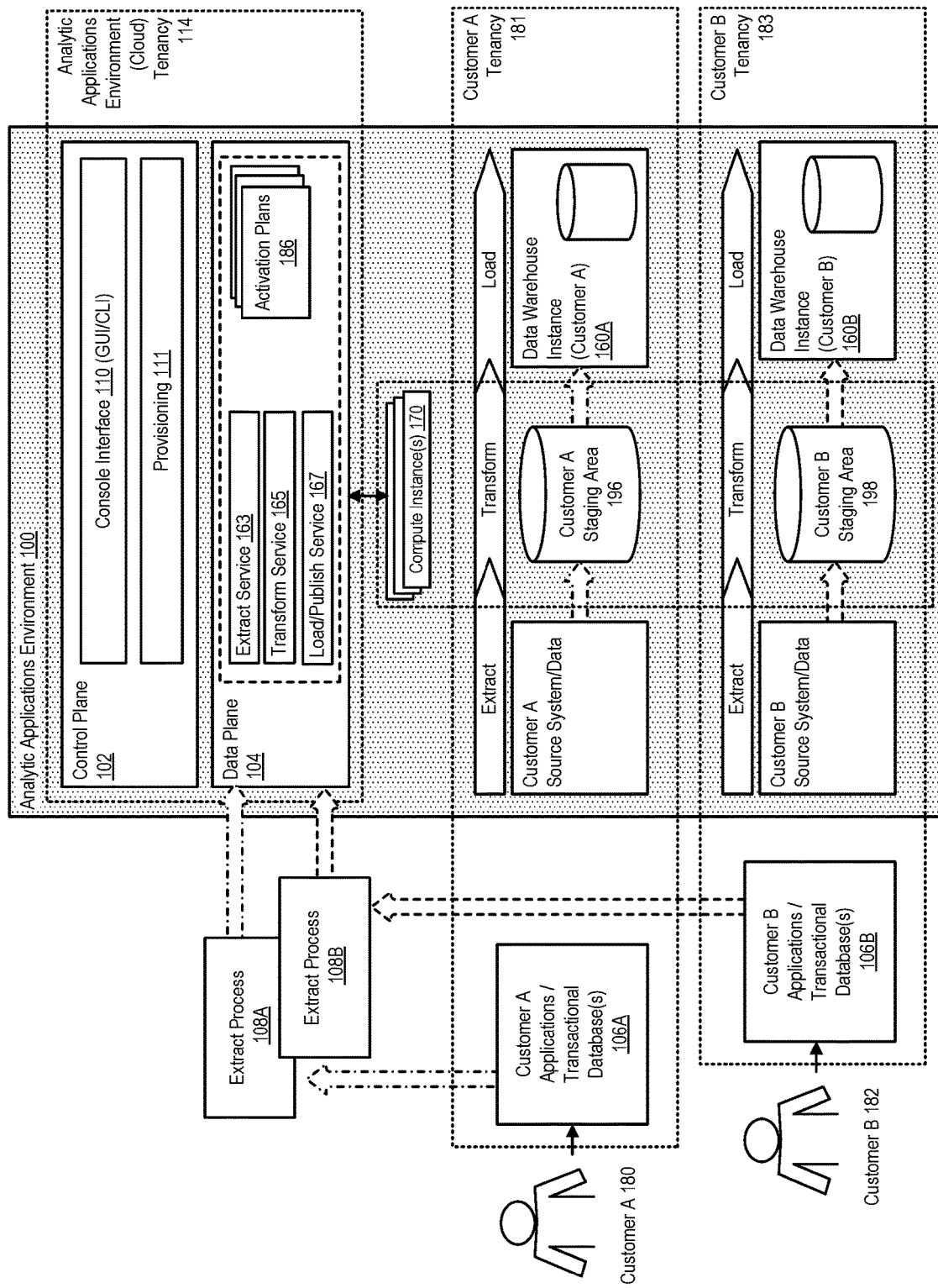
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
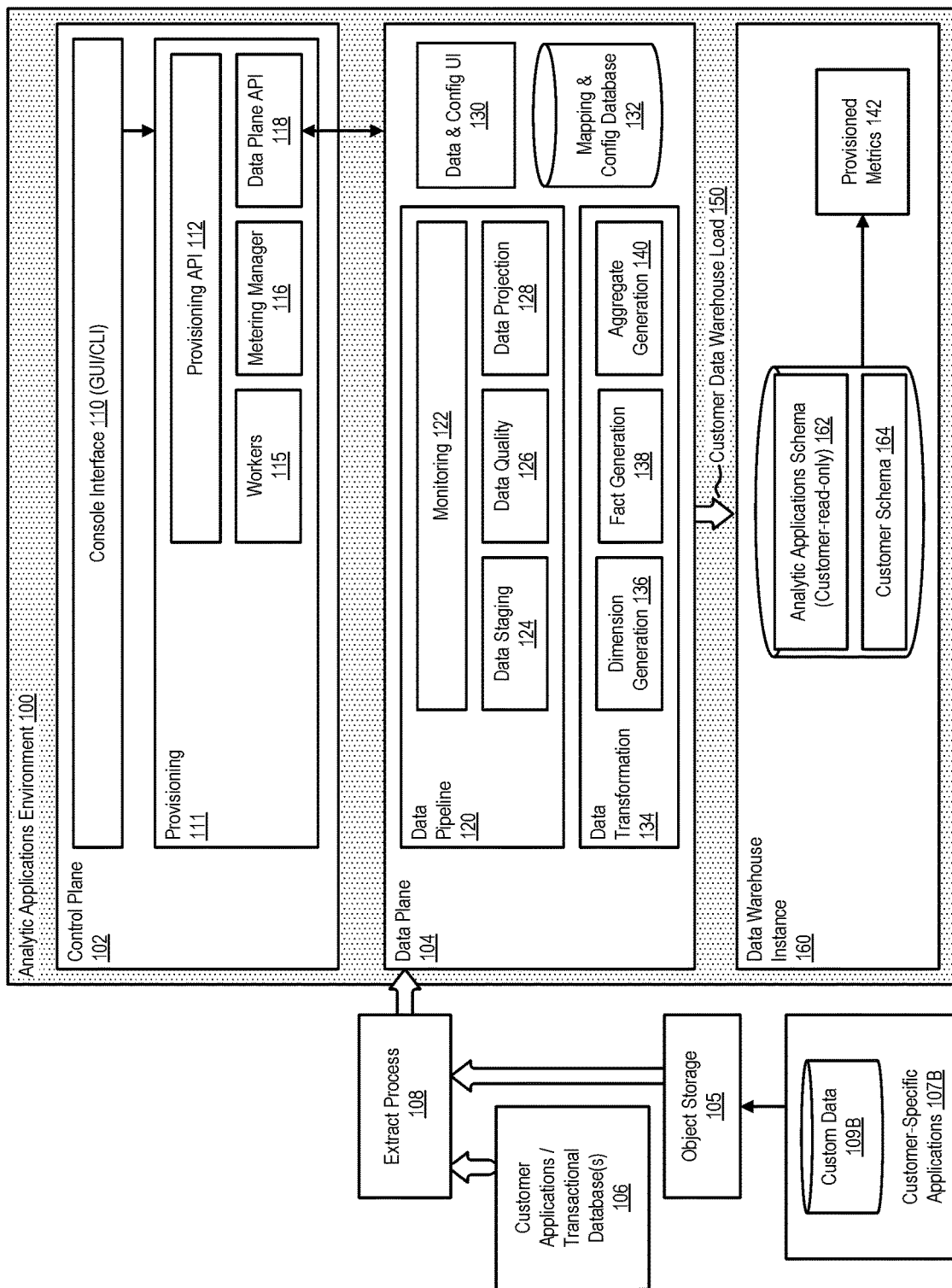
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
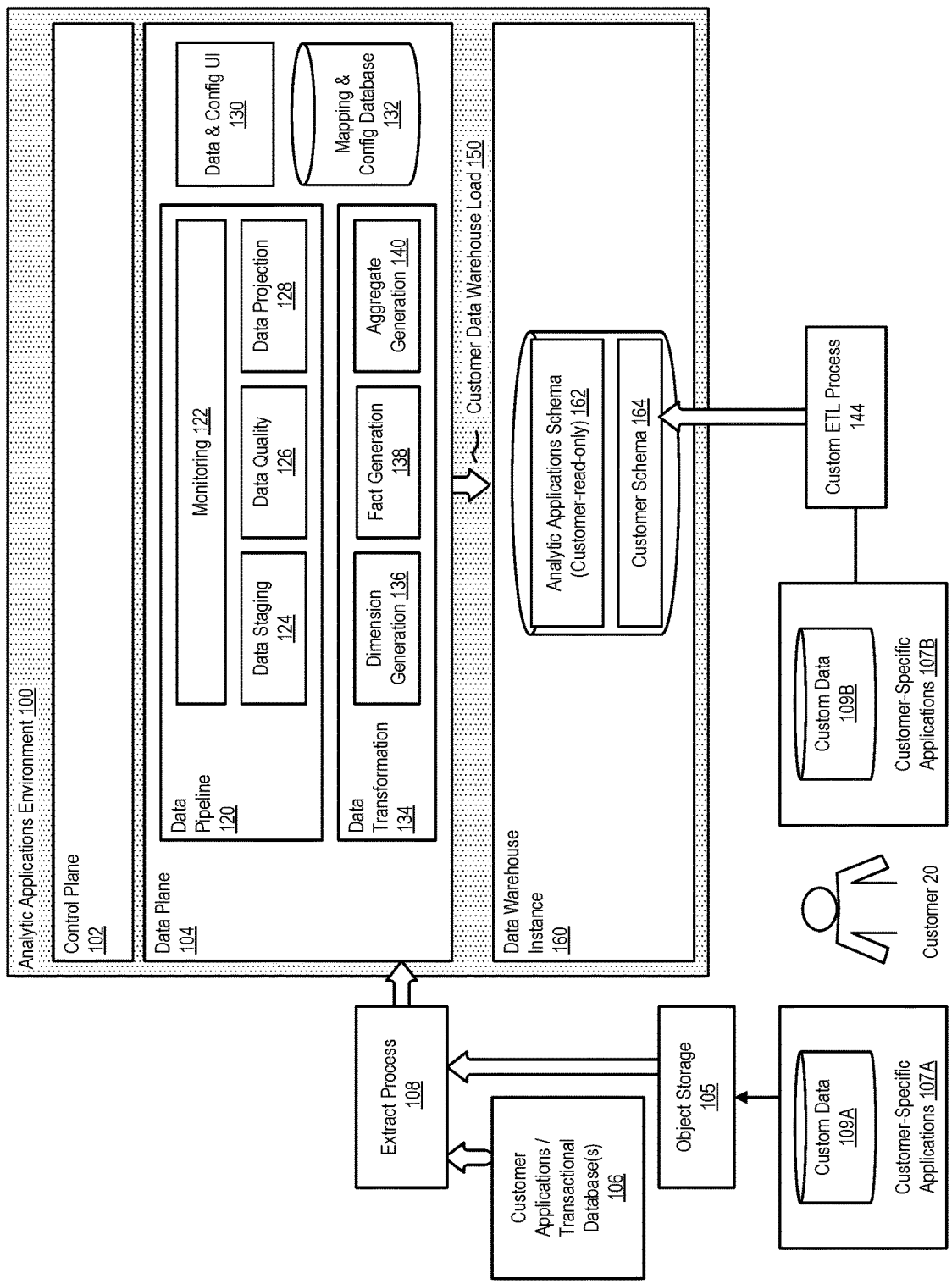
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
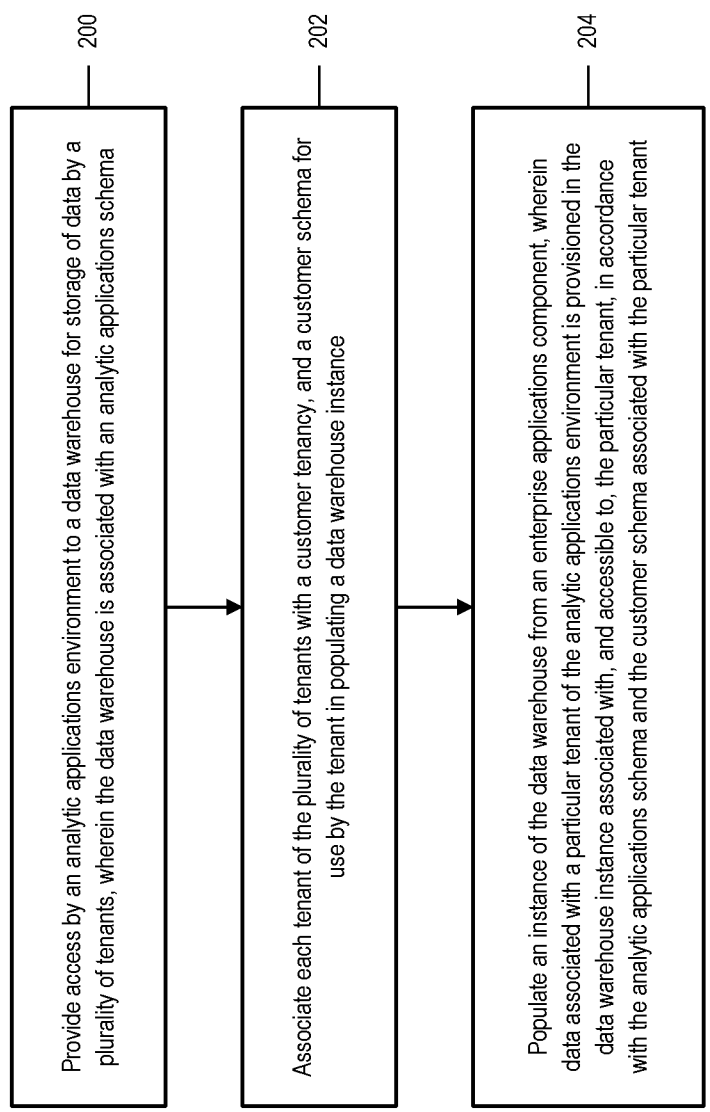
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202 each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Determination of Recommendations or Alerts

During the loading of data, from one or more data sources, to a data warehouse or other database, there may be a need to prepare the data in some manner; for example by extracting the data from a highly-normalized transactional system data source, and transforming the data into one or more data warehouse or database schemas that support analytic querying and business intelligence processes.

For example, an Extract, Transform, and Load (ETL) process can be used to extract data from a source database, pass the data through a middle-tier transformation server, and then transform the data into a schema suitable for use in a data warehouse. During such process, data that may need to be looked-up from the target database can be cached on a local server. Once the data is transformed locally, it can be loaded into the target database.

A data warehouse can store large amounts of enterprise-critical data, such as, for example, data related to procurement prices, employee salaries, or expense reports; and as such is rich in valuable business intelligence information. However, conventionally the data stored by an organization in a data warehouse is generally not shared with other organizations; and instead each organization has generally been limited to only that information that could be extracted from their own data warehouse.

In accordance with an embodiment, described herein are systems and methods for use with an analytic applications environment, for determination of recommendations and alerts in such environments. A data pipeline or process can operate in accordance with an analytic applications schema adapted to address particular analytics use cases or best practices, to receive data from a customer's (tenant's) enterprise software application or data environment, for loading into a data warehouse instance. When provided as part of a software-as-a-service (SaaS) or cloud environment, the data sourced from a plurality of organizations can be aggregated, to leverage information gleaned from the collective or shared data. The system can be used to generate semantic alerts, including obtaining permission from; and analyzing the collective data of; the plurality of organizations, to determine operational advantages indicated by the data, and providing alerts associated with those operational advantages.

Figure 11:
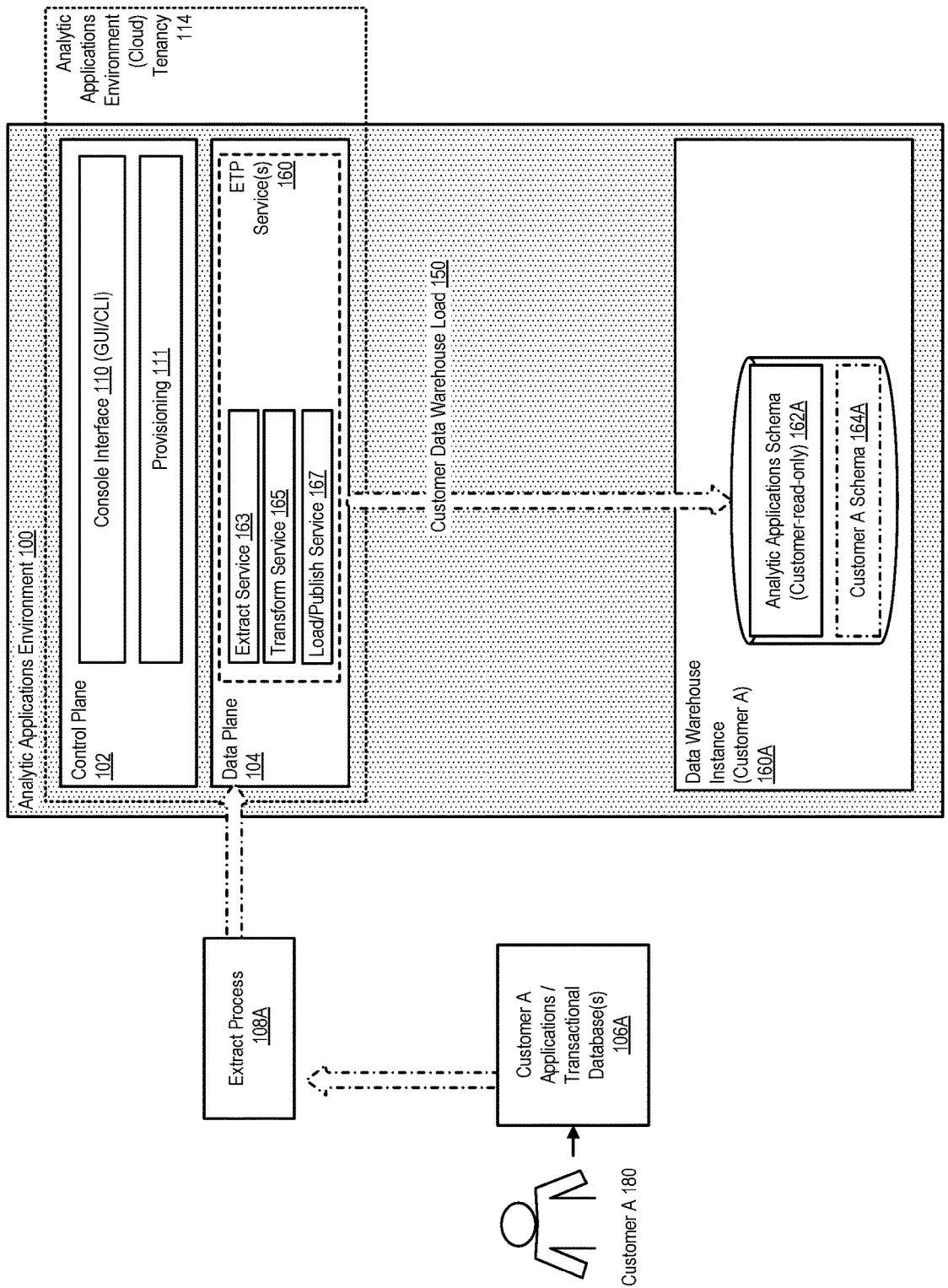
FIG. 11 illustrates a system for use with an analytic applications environment, for determination of recommendations and alerts, in accordance with an embodiment.

FIG. 11 illustrates a system for use with an analytic applications environment, for determination of recommendations and alerts, in accordance with an embodiment.

As illustrated in FIG. 11, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, a data pipeline such as an ETL process, on a periodic or other basis, as described above.

In accordance with an embodiment, the data pipeline or process can be scheduled to execute at intervals (e.g., hourly/daily/weekly) to extract transactional data from an enterprise software application or data environment, such as, for example, business productivity software applications and corresponding transactional databases that are provisioned in the SaaS environment. An extract process can extract the transactional data, whereupon extraction the data pipeline or process can insert extracted data into a data staging area 242, which can act as a temporary staging area for the extracted data.

In accordance with an embodiment, data transformations as used within ETL processes are typically configured by rules. After transformation of the extracted data, the data pipeline can execute a load procedure, to load the transformed data into the customer schema of data warehouse. Upon loading of the transformed data into customer schema, the transformed data can be analyzed and used in business intelligence processes.

In accordance with an embodiment, in a cloud environment (e.g., a SaaS environment) which may be accessible by many organizations, some organizations may not wish to share their data or information with particular other organizations (for example, where the organizations operate competitively against one another. However, for other organizations, the benefits of sharing data or BI information with other businesses may provide various advantages.

In accordance with an embodiment, information retrieved from several different organizations having database or data warehouses in the same cloud environment can be used by the system to generate recommendations or alerts, for example when data values indicate a possibility of more optimal operations regarding particular financial and/or semantic scenarios.

As an illustrative example, if two organizations that are both customers of a cloud computing environment (e.g., a SaaS environment) operate within the same market for procuring microprocessors, but those two organizations are receiving different quotes for those goods, as reflected in invoices that are recorded in the cloud computing environment, then an alert can be issued to the organization that has received the higher-cost quote, recommending that the organization may have room for negotiation with the seller.

As another illustrative example, if an aggregated data reflects that an organization regularly buys microprocessors, and further data reveals an upward trend in prices, then an appropriate recommendation or alert can be issued to that organization, allowing them to perhaps hedge their costs.

As another illustrative example, if two employees of two different, respective organizations both stay at a same hotel, but their expense reports indicate markedly different hotel charges, then an alert can be issued to the organization with the higher expense, recommending that organization to review or investigate that expense.

Figure 12:
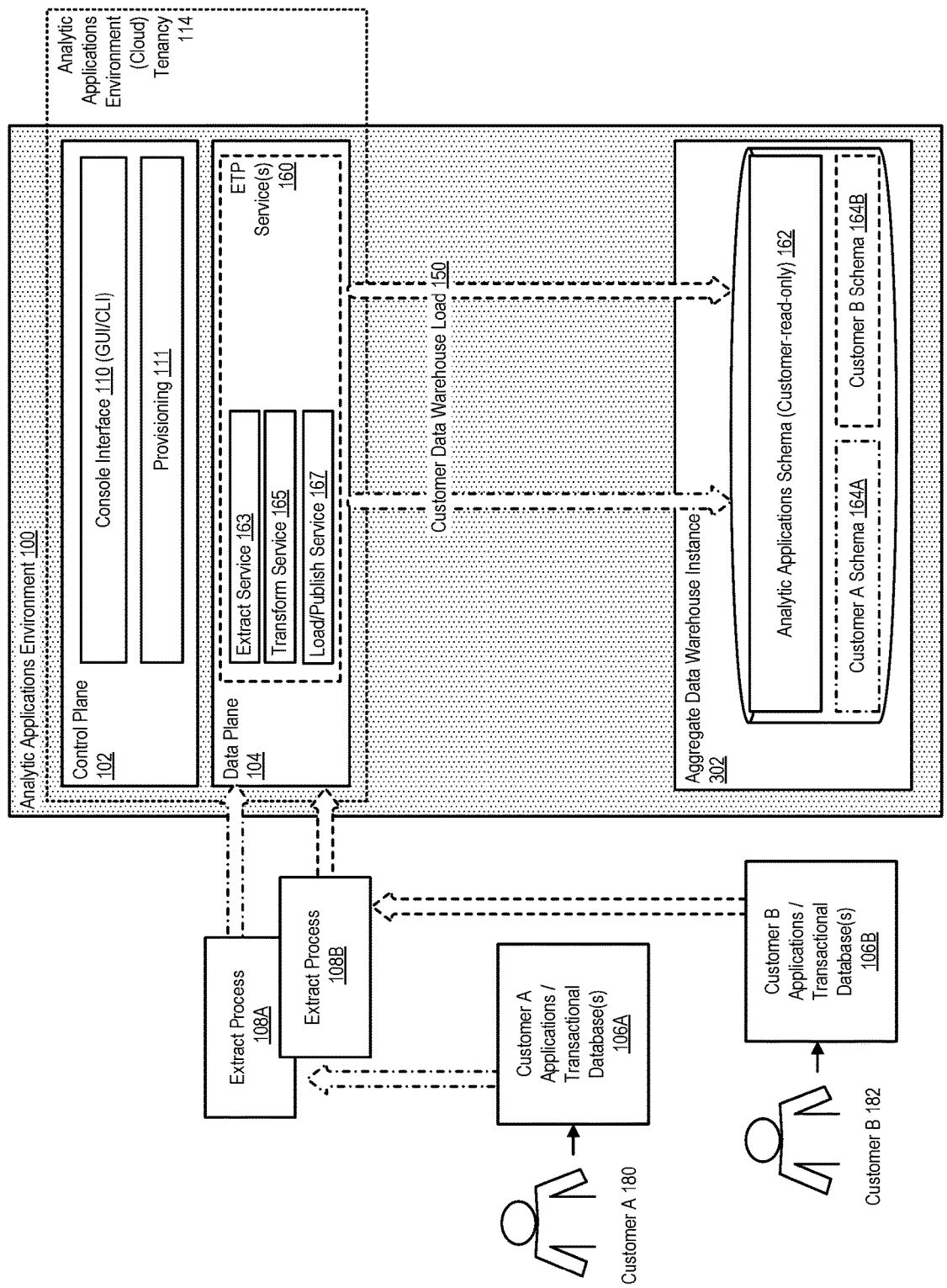
FIG. 12 further illustrates a system for use with an analytic applications environment, for determination of recommendations and alerts, in accordance with an embodiment.

FIG. 12 further illustrates a system for use with an analytic applications environment, for determination of recommendations and alerts, in accordance with an embodiment.

As illustrated in FIG. 12, in accordance with an embodiment, an ETL process can extract transactional data from the transactional databases of participating customers of a cloud computing environment (e.g., business organizations). As a result of the ETL process, the historical data of the participating customers can be stored in the customers' respective schemas in the data warehouse. Data can then be aggregated or otherwise collected into an aggregate data warehouse instance 302, and analytics or queries executed against the data stored in the aggregate data warehouse instance.

Figure 13:
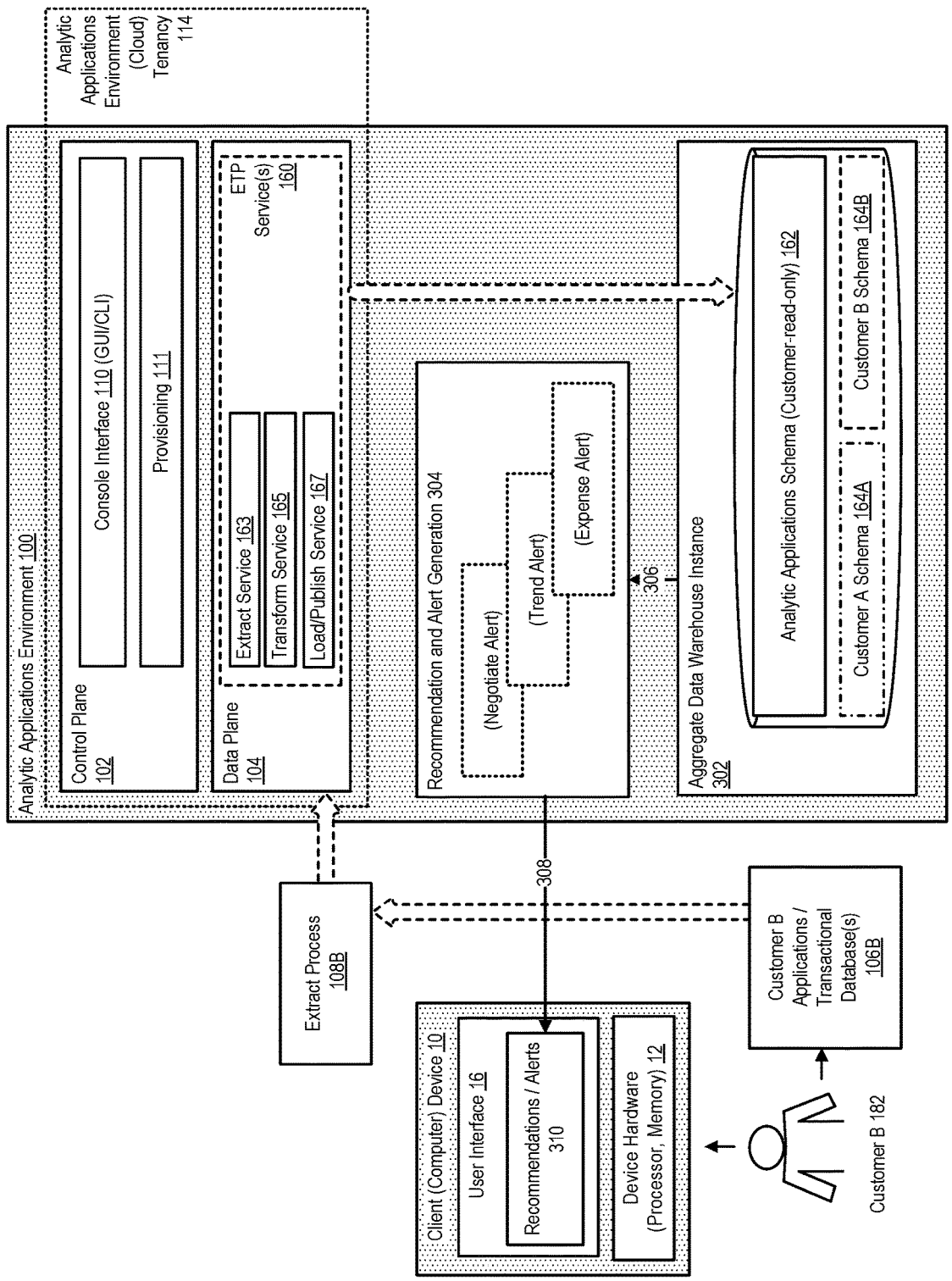
FIG. 13 further illustrates a system for use with an analytic applications environment, for determination of recommendations and alerts, in accordance with an embodiment.

FIG. 13 further illustrates a system for use with an analytic applications environment, for determination of recommendations and alerts, in accordance with an embodiment.

As illustrated in FIG. 13, in accordance with an embodiment, based on a result of running such analytics or queries 306 against the data stored in the aggregate data warehouse instance, one or more recommendations/alerts 310 can be generated 304, and sent 308 to participating customers.

In accordance with an embodiment, only data which is considered relevant for the purposes of determining particular recommendations or alerts is aggregated or otherwise collected into the aggregate customer data warehouse. Depending on the particular configuration or customer wishes, their customer data as aggregated into either their customer warehouse, and/or the aggregate data warehouse, may be stored either indefinitely, or may be deleted after the configured analytics and queries are processed against the data.

In accordance with an embodiment, a common motivation in the above examples is to provide cost savings to an organization that is a customer (or tenant) of the cloud computing environment. Such cost savings can be obtained either using predictive analysis or comparison of costs using mutually shared data of a number of organizations, each of which is a customer of the some cloud computing environment. This type of analysis and subsequent alerting is generally not possible with an organization's on-premise applications and data, since in those environments the required data is inaccessible behind an organization's firewall.

In accordance with an embodiment, a variety of different types of recommendations or alerts can be generated using shared data from multiple organizations accessible in a cloud computing environment. Examples of alert types as described herein can include negotiate alerts, trend alerts, and expense alerts.

In accordance with an embodiment, a negotiate alert can be provided when two organizations are negotiating for similar products and similar quantities. For example, one of the organizations may have concluded their negotiations with a particular seller, and placed a purchase order; while the other organization is still in the negotiation process. Data describing the placed purchase order can be used by the system to determine whether the organization that is still in negotiations is receiving the same, better, or worse pricing relative to the organization that placed the purchase order, and appropriate alerts reflecting the pricing information can be sent.

In accordance with an embodiment, a trend alert can be provided based on regular past purchases of an organization. For example, if the organization usually procures a product in July, but analysis of shared data by the system indicates that a second organization received a low price for the same product in May, then an alert can be issued by the system to the first organization, indicating the possibility of a downward trend in the price of the product in May.

In accordance with another example embodiment, an analysis of shared data may also indicate rising or falling price trends based on raw material prices and availability. A calculation by the system of trends based on information pertaining to the manufacturing process of particular products, and alerts can be issued to organizations who have subscribed to or are otherwise known to have interests in such pricing trends.

In accordance with an embodiment, an expense alert can be provided by the system when two organizations have procured or expensed a same (or similar) product, but one has incurred significantly higher costs, as reflected in the aggregated data. An alert to the organization having the higher cost can be issued.

In accordance with an embodiment, recommendations or alerts generated on the basis of the above criteria can also be sent to the organizations that are setting a baseline in order to allow that organization to assess that it is operating efficiently. For example, one or more of a negotiate alert, trend alert, or expense alert can be issued by the system to an organization when, based on the available shared deadline, that organization has obtained the best (or at least a good) price, when it has purchased at a low-trending price, or when its expenses were the lowest observed.

In accordance with an embodiment, permission can be obtained from each of the multiple organizations that store data in a cloud environment (e.g., in a data warehouse offered in a SaaS or PaaS environment), to use each of those corporations' data. For example, a permission contract can specify that an organization's data will only be used in an anonymous manner. The organization can also provide an exclude list to prevent specific organizations from having access to alerts generated using the organization's data.

For example, a particular organization may elect to opt in to an alert service offered as a service of a cloud computing environment, and can specify a list of competitors for which alerts generated through the use of that organization's data should not be sent.

In accordance with an embodiment, after an organization opts in by providing permission for their data to be used, the organization's historical data can be analyzed. Sensitive and personal information captured in the organization's historical data that is stored in the cloud-provided data warehouse can be masked, anonymized, or otherwise removed from consideration during the analysis and generation of an alert, for example using a differential privacy or other technique. After the sensitive and personal information is masked, anonymized, or removed, the data store in the aggregate data warehouse describing, for example, costs such as procurement data, expenses, or salaries, can be analyzed and a potential savings figure can be provided to a subscribing organization.

In accordance with an embodiment, the system can also generate a potential savings estimate or value, by running alert analyses on shared data and computing the potential savings. An organization that has opted into the alert service can be added to a list of other organizations that have also opted in to receive recommendations and alerts; and such recommendations and alerts can be provided on a regular basis.

In accordance with an embodiment, reports can also be generated and shared at regular intervals on the cost savings achieved by a subscribing organization whenever they have acted upon the recommendations/alerts. For example, the participating organizations can be provided a financial optimality rank that informs them how optimal their financial processes are.

Negotiate Alerts

In accordance with an embodiment, the system can provide a negotiate alert by first detecting an organization negotiating the purchase of a product or service (the detection can be based on, e.g., invoice prices, quotes, requests for proposals).

For example, based on the data stored in the aggregate data warehouse, a search can be performed for other organizations negotiating for the same product or service, or organizations that have recently purchased the same product or service. When other organizations that are negotiating for, or have purchased, the same or similar product or service, the price per unit and the quantities purchased can be compared to that of the negotiating organization. If the quantities are similar but the price per unit is higher, then the system can generate and communicate a negotiate alert for the negotiating organization indicating the higher prices.

In accordance with an embodiment, the determined quantities of a product may be different from the quantities that the negotiating organization desires. In such example, a machine learning classifier (e.g., regression analysis, neural networks, or decision tree regression) can be trained to interpolate the prices in accordance with the desired quantities.

Trend Alerts

In accordance with an embodiment, the system can provide a trend alert to provide organizations with information on trends (e.g., pricing trends). For example, an organization may purchase a product every quarter (e.g., a personal computer manufacturer may regularly purchase hard disks). Based on the data stored in the aggregate data warehouse, prices on products and services acquired by other organizations can be monitored, and an alert can be issued by the system f there is an opportunity to save money through an early or later purchase.

In accordance with an embodiment, forecasting of prices can also be undertaken through an analysis of trends based on raw material prices and availability. Such trends based on information pertaining to the manufacturing process of particular products, such as raw materials, labor, capital, or equipment, can produce longer term pricing trends (e.g., forecasts), and alerts can be issued to organizations known to have interests in such pricing trends.

In accordance with an embodiment, historical orders made on a regular basis can be determined from the warehouse data. For example, if the date of the last order is indicated by D, then similar recent orders of other organizations whose order date is greater than D can be queried. A trend can be predicted based on the query results, and a prediction of the price for a similar order on the evaluation date can be made. The system can then send an alert to the purchasing organization.

Expense Alerts

In accordance with an embodiment, based on the data stored in the aggregate data warehouse, similar expenses of different organizations can be compared, and an alert can be issued by the system if an expense appears to be anomalous.

For example, for each participating organization, all expenses for the period of interest (e.g., a day, week or month) can be queried. For each expense type identified, all similar expenses from each participating organization can be grouped and compared. The definition of similarity can depend on the type of expense. For example, if the expense is a hotel or lodging-type expense, similarity could be defined as the price for a similar class of room for the same or overlapping dates. If the expense is a taxi or transportation-type expense, similarity can be defined as the ride cost for similar distances on similar days in similar locations.

In accordance with an embodiment, once expenses are determined and appropriately classified, the system can perform anomaly detection on this data in order to detect anomalies. If the data for a particular organization is detected as an anomaly, then an expense alert can be generated and sent to the organization. In accordance with an embodiment, various different computational processes or algorithms can be used (e.g., DBSCAN, LOF, Autoencoders) to perform the anomaly detection.

Computation of Savings

In accordance with an embodiment, after the system generates recommendations and/or alerts based on data stored in the aggregate customer data warehouse as described above, a potential savings figure can also be computed.

For example, Table 1 shows an exemplary embodiment of generating a potential savings figure for each type of recommendation or alert discussed above.

TABLE 1

| Alert type | Savings formula |
| --- | --- |
| Negotiation | Savings = (invoice price − final price) * quantity. One could also use recommended price instead of the final price obtained. |
| Trend | Savings = (price when purchase recommended − price at next scheduled purchase) * quantity |
| Expense | Savings = (Estimated expense − actual expense) |

In accordance with an embodiment, the savings for each organization can be summed up and reported to the organization. In cases where a recommendation was made but not acted upon, a "lost savings" figure can be computed and sent.

Optimality Ranking

In accordance with an embodiment, for participating customers that have opted in to allow their data to be used for purposes of generating recommendations and alerts, a (financial) optimality rank can be computed and sent to the respective organization.

For example, for each organization, a recommendation or alert provided to the organization can be labeled as "Give" or "Take". A recommendation or alert is a "Give" for an organization, if the providing organization had, for example, obtained a lower price for a product or service, which information was then recommended to another organization. A recommendation is a "Take" for an organization if the receiving organization benefited from such a recommendation.

In accordance with an embodiment, the various "Gives" and "Takes" can be summed up for all the participating organizations and a quantity as their usefulness can be computed as, for example, Optimality=Number of Gives−Number of Takes.

In accordance with an embodiment, the organizations can be sorted by the system, based on their determined optimality rank, and can be associated with or otherwise provided with their relative optimality rank. For example, the optimality can be computed based on the financial savings over all the Gives and Takes as follows:

$$\text{OPTIMALITY} = \left( \frac{\Sigma_{Gives} \text{ Savings} - \Sigma_{Takes} \text{ Savings}}{\text{Number of Gives} + \text{Number of Takes}} \right)$$

In yet another embodiment, the optimality ranks/scores can be displayed, for example as a leaderboard for organizations who have opted to do so, for reference and use by other organizations.

Figure 14:
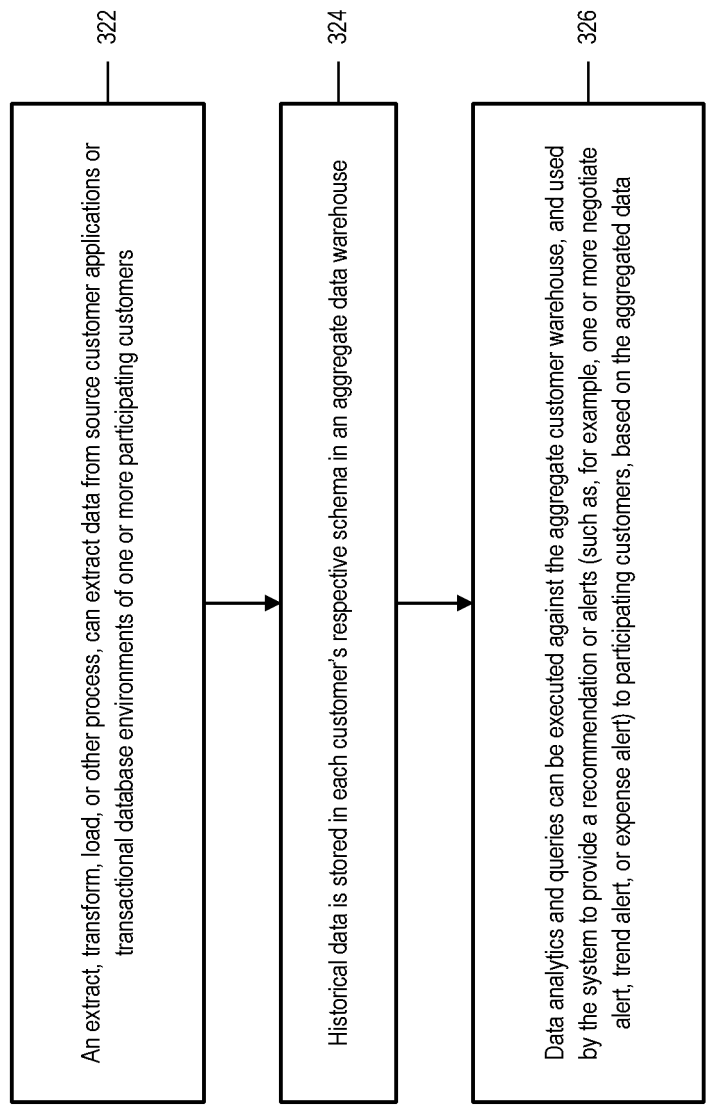
FIG. 14 illustrates a flowchart of a method for determination of recommendations and alerts, in accordance with an embodiment.

FIG. 14 illustrates a flowchart of a method for determination of recommendations and alerts, in accordance with an embodiment.

As illustrated in FIG. 14, in accordance with an embodiment, at step 322, an extract, transform, load, or other process, can extract data from source customer applications or transactional database environments of one or more participating customers.

At step 324, historical data is stored in each customer's respective schema in an aggregate data warehouse.

At step 326, data analytics and queries can be executed against the aggregate customer warehouse, and used by the system to provide a recommendation or alerts (such as, for example, one or more negotiate alert, trend alert, or expense alert) to participating customers, based on the aggregated data.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with enterprise software applications components such as Oracle Fusion Applications; cloud environments such as Oracle Cloud Infrastructure; and cloud services such as Oracle Fusion Analytics; in accordance with various embodiments, the systems and methods described herein can be used with other types of enterprise software applications, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with an analytic applications environment, for determination of recommendations and alerts, comprising:
   a computer including one or more processors, that provides access by an analytic applications environment to a data warehouse for storage of data by a plurality of tenants, wherein the data warehouse is associated with an analytic applications schema;
   wherein each tenant of the plurality of tenants is associated with a customer tenancy, and a customer schema for use by the tenant in populating a data warehouse instance, wherein data associated with a particular tenant is provisioned in the data warehouse instance associated with, and accessible to, the particular tenant, in accordance with the analytic applications schema and the customer schema associated with the particular tenant;
   wherein a data pipeline process extracts data from a plurality of enterprise application or database environments, including a first enterprise application or database environment and a second enterprise application or database environment, to be loaded into a data warehouse;
   wherein for a particular tenant of the environment associated with a particular enterprise application environment, data is loaded by the data pipeline or other processing component into the data warehouse as a shared data, for use in determining one or more alerts or recommendations based on the shared data;
   wherein a plurality of entities sharing data are sorted based on a rank determined for each entity based at least in part on a number of recommendations associated with that entity, and wherein the rank is used in determining, for the particular tenant, alerts or recommendations based on the shared data;
   wherein the plurality of entities are sorted based on a determined optimality for each entity to identify a relative optimality rank for each entity; and
   wherein the relative optimality rank is determined for each entity based at least in part on a number of give recommendations and a number of take recommendations associated with that entity.

2. The system of claim 1, wherein the data received from the plurality of enterprise application or database environments includes cost information associated with products, and wherein the alerts or recommendations include a negotiate alert provided when two entities sharing data are negotiating for similar products and similar quantities.

3. The system of claim 1, wherein the data received from the plurality of enterprise application or database environments includes cost information associated with products, and wherein the alerts or recommendations include a trend alert provided based on regular past purchases of an entity indicative of a trend in a price of a product.

4. The system of claim 1, wherein the data received from the plurality of enterprise application or database environments includes cost information associated with products, wherein the alerts or recommendations includes an expense alert provided when two entities sharing data have procured or expensed a same or similar product, but one entity has incurred significantly higher costs associated with the product.

5. The system of claim 1, wherein the alerts or recommendations are provided as an information including a computed savings for an entity, based on the shared data, wherein an alert service configured to generate the one or more alerts or recommendations comprises an opt in option to allow the data pipeline process to extract the data, the alert service configurable to define an exclude list that prevents one or more organizations from having access to one or more alerts generated using the shared data.

6. The system of claim 1, comprising:
   extracting the data from the plurality of enterprise application or database environments, wherein the data comprises enterprise-critical data extracted from behind a firewall, the enterprise-critical data including one or more of procurement prices, employee salaries, and expense reports;
   storing the data as historical data in the data warehouse;
   aggregating the historical data;
   analyzing the historical data to determine a plurality of alerts or recommendations;
   determining that a first subset of the plurality of alerts or recommendations is based on data provided by the first enterprise application or database environment and associated with a first tenant or entity;
   determining that a second subset of the plurality of alerts or recommendations is based on data provided by the second enterprise application or database environment and associated with a second tenant or entity;
   determining the optimality rank of each tenant or entity based on the alerts or recommendations resulting from the data provided by each enterprise application or database environment.

7. The system of claim 1, wherein the computer environment maintains, for a plurality of tenants (customers) of the environment:
   a data warehouse instance associated with each tenant, including a first data warehouse instance associated with a first tenant, and a second data warehouse instance associated with a second tenant; and
   an analytics schema associated with each data warehouse instance, that enables data to be loaded automatically, by the data pipeline or other processing component, to a particular data warehouse instance in accordance with the analytics schema, to pre-populate the data warehouse instance with business intelligence or analytics data retrieved from an associated tenant enterprise application or database environment.

8. The system of claim 1, wherein each tenant and data warehouse instance is additionally associated with a customer schema, including:
   a first customer schema associated with the first tenant and first data warehouse instance; and
   a second customer schema associated with the second tenant and second data warehouse instance;
   wherein the contents of the particular data warehouse instance are controlled by the data pipeline or other processing component operating automatically in accordance with the analytics schema, and by the customer schema associated with the particular data warehouse instance.

9. The system of claim 1, wherein the give recommendations correspond to a providing entity being recommended to another entity and the take recommendations correspond to a receiving entity benefiting from the recommendation.

10. The system of claim 1, wherein the number of give recommendations and the number of take recommendations are summed for all of the plurality of entities to determine a usefulness, and the relative optimality rank is computed based on a financial savings over all of the give recommendations and the take recommendations.

11. A method for use with an analytic applications environment, for determination of recommendations and alerts, comprising:
    providing, at a computer including one or more processors, access by an analytic applications environment to a data warehouse for storage of data by a plurality of tenants, wherein the data warehouse is associated with an analytic applications schema;
    wherein each tenant of the plurality of tenants is associated with a customer tenancy, and a customer schema for use by the tenant in populating a data warehouse instance, wherein data associated with a particular tenant is provisioned in the data warehouse instance associated with, and accessible to, the particular tenant, in accordance with the analytic applications schema and the customer schema associated with the particular tenant;
    wherein a data pipeline process extracts data from a plurality of enterprise application or database environments, including a first enterprise application or database environment and a second enterprise application or database environment, to be loaded into a data warehouse;
    wherein for a particular tenant of the environment associated with a particular enterprise application environment, data is loaded by the data pipeline or other processing component into the data warehouse as a shared data, for use in determining one or more alerts or recommendations based on the shared data;
    wherein a plurality of entities sharing data are sorted based on a rank determined for each entity based at least in part on a number of recommendations associated with that entity, and wherein the rank is used in determining, for the particular tenant, alerts or recommendations based on the shared data; and
    wherein the plurality of entities are sorted based on a determined optimality for each entity to identify a relative optimality rank for each entity; and
    wherein the relative optimality rank is determined for each entity based at least in part on a number of give recommendations and a number of take recommendations associated with that entity.

12. The method of claim 11, wherein the data received from the plurality of enterprise application or database environments includes cost information associated with products, and wherein the alerts or recommendations include a negotiate alert provided when two entities sharing data are negotiating for similar products and similar quantities.

13. The method of claim 11, wherein the data received from the plurality of enterprise application or database environments includes cost information associated with products, and wherein the alerts or recommendations include a trend alert provided based on regular past purchases of an entity indicative of a trend in a price of a product.

14. The method of claim 11, wherein the data received from the plurality of enterprise application or database environments includes cost information associated with products, wherein the alerts or recommendations includes an expense alert provided when two entities sharing data have procured or expensed a same or similar product, but one entity has incurred significantly higher costs associated with the product.

15. The method of claim 11, wherein the alerts or recommendations are provided as an information including a computed savings for an entity, based on the shared data.

16. The method of claim 11, wherein the information is provided as a financial optimality of entities, including that an alert or recommendation associated with an entity that results in a lower product price increases a financial optimality associated with that entity; or wherein a plurality of entities can be sorted or ranked based on a determined financial optimality for each entity.

17. The method of claim 11, comprising:
    extracting the data from the plurality of enterprise application or database environments;
    storing the data as historical data in the data warehouse;
    aggregating the historical data;
    analyzing the historical data to determine a plurality of alerts or recommendations;
    determining that a first subset of the plurality of alerts or recommendations is based on data provided by the first enterprise application or database environment and associated with a first tenant or entity;
    determining that a second subset of the plurality of alerts or recommendations is based on data provided by the second enterprise application or database environment and associated with a second tenant or entity;
    determining the optimality rank of each tenant or entity based on the alerts or recommendations resulting from the data provided by each enterprise application or database environment.

18. The method of claim 11, wherein the computer environment maintains, for a plurality of tenants (customers) of the environment:
    a data warehouse instance associated with each tenant, including a first data warehouse instance associated with a first tenant, and a second data warehouse instance associated with a second tenant; and
    an analytics schema associated with each data warehouse instance, that enables data to be loaded automatically, by the data pipeline or other processing component, to a particular data warehouse instance in accordance with the analytics schema, to pre-populate the data warehouse instance with business intelligence or analytics data retrieved from an associated tenant enterprise application or database environment.

19. The method of claim 11, wherein each tenant and data warehouse instance is additionally associated with a customer schema, including:
    a first customer schema associated with the first tenant and first data warehouse instance; and
    a second customer schema associated with the second tenant and second data warehouse instance;
    wherein the contents of the particular data warehouse instance are controlled by the data pipeline or other processing component operating automatically in accordance with the analytics schema, and by the customer schema associated with the particular data warehouse instance.

20. A non-transitory computer readable storage medium having instructions thereon, which when read and executed by a computer including one or more processors cause the computer to perform a method comprising:

providing access by an analytic applications environment to a data warehouse for storage of data by a plurality of tenants, wherein the data warehouse is associated with an analytic applications schema;

wherein each tenant of the plurality of tenants is associated with a customer tenancy, and a customer schema for use by the tenant in populating a data warehouse instance, wherein data associated with a particular tenant is provisioned in the data warehouse instance associated with, and accessible to, the particular tenant, in accordance with the analytic applications schema and the customer schema associated with the particular tenant;

wherein a data pipeline process extracts data from a plurality of enterprise application or database environments, including a first enterprise application or database environment and a second enterprise application or database environment, to be loaded into a data warehouse;

wherein for a particular tenant of the environment associated with a particular enterprise application environment, data is loaded by the data pipeline or other processing component into the data warehouse as a shared data, for use in determining one or more alerts or recommendations based on the shared data;

wherein a plurality of entities sharing data are sorted based on a rank determined for each entity based at least in part on a number of recommendations associated with that entity, and wherein the rank is used in determining, for the particular tenant, alerts or recommendations based on the shared data; and wherein the plurality of entities are sorted based on a determined optimality for each entity to identify a relative optimality rank for each entity; and wherein the relative optimality rank is determined for each entity based at least in part on a number of give recommendations and a number of take recommendations associated with that entity.

\* \* \* \* \*